United States Patent [19]
Lowe

[11] 3,804,066
[45] Apr. 16, 1974

[54] MULTI-DWELLING BIRDHOUSE

[76] Inventor: William A. Lowe, 963 Lavoie Ave., Elgin, Ill. 60120

[22] Filed: Dec. 4, 1972

[21] Appl. No.: 311,872

[52] U.S. Cl. ............................................... 119/23
[51] Int. Cl. .......................................... A01k 31/00
[58] Field of Search ........................ 119/23, 24, 19

[56] References Cited
UNITED STATES PATENTS
| 1,522,815 | 1/1925 | George | 119/23 |
| 1,358,119 | 11/1920 | Shrock | 119/23 |
| 1,516,381 | 11/1924 | Erickson | 119/23 |

Primary Examiner—Antonio F. Guida
Assistant Examiner—J. N. Eskovitz

[57] ABSTRACT

A multi-part multi-compartment birdhouse including a plurality of vertically stacked substantially identical containers each having a plurality of entrance openings spaced about the wall surfaces thereof and each having a removable set of dividers disposed in each container for dividing the container into a plurality of individual compartments, each container comprising a tier of the birdhouse with each tier being separated by a tier separation member, a roof member adapted to cover the top of the topmost container, and a plurality of elongated bolt like members passed through a like number of spaced apart openings in the roof member and tier separation members for assembling the birdhouse in a manner permitting ease of disassembly thereof for purposes of cleaning and replacement of components, and each tier separation member providing an individual and private balcony and perch for each of the entrance openings of each associated container.

3 Claims, 1 Drawing Figure

3,804,066

MULTI-DWELLING BIRDHOUSE

BACKGROUND OF INVENTION

FIELD OF INVENTION

The present invention relates generally to a four sided multi-compartmented birdhouse and more specifically is directed to a simple economical design, greater number of compartments in less number of tiers and simplicity and ease of cleaning.

DESCRIPTION OF PRIOR ART

Birdhouses available today do not offer the inexpensive, streamlined and symmetrical design in the sense that many parts are needed and each component requiring a sizeable amount of workmanship hours to finish. Likewise, the excessive number of parts render present birdhouses unnecessarily heavy in addition to the cumbersomeness of assembly in the event disassembled parts are received by purchaser of a birdhouse. Another major disadvantage of present birdhouses is the difficulty of cleaning same, though some birdhouses provide latches for compartment walls, they are not easily accessible.

SUMMARY OF INVENTION

It is the inventor's observation of the disadvantages of present day birdhouses that generated the urgent desire for an improved birdhouse.

It is the intent of this new and improved birdhouse to fill the shortcomings inherent in present day birdhouses.

The new and improved birdhouse combines the desirable feature of present day birdhouses in addition to other functional features.

Some birdhouse owners may desire to attract purple martins. These birds feed on flying insects especially mosquitoes. The purple martin is one of the most gregarious species of bird that is particularly choosy of its residence. One noted characteristic of a purple martin which nests in a birdhouse is the cleanliness of that birdhouse. Cleanliness does not mean only clean to a purple martin. The nesting compartments, the seams and corners and more specifically the entrance aperture must be smooth and free of burrs. The location of the birdhouse is also an important factor but entirely dependent on the birdhouse owner.

It is one object of this new and improved birdhouse to offer an inexpensive affordable birdhouse capable of attracting species of birds that settle on birdhouses and more particularly purple martins.

It is another object of this new and improved bird house to offer a simple and streamlined design with less number of component parts while providing more nesting compartments.

Other objects and advantages will become clear as the description of this invention is continued with the attached drawings of preferred embodiments.

BRIEF DESCRIPTION OF DRAWINGS

The FIGURE is an exploded view showing each component.

DESCRIPTION OF PREFERRED EMBODIMENTS

Figure 1:
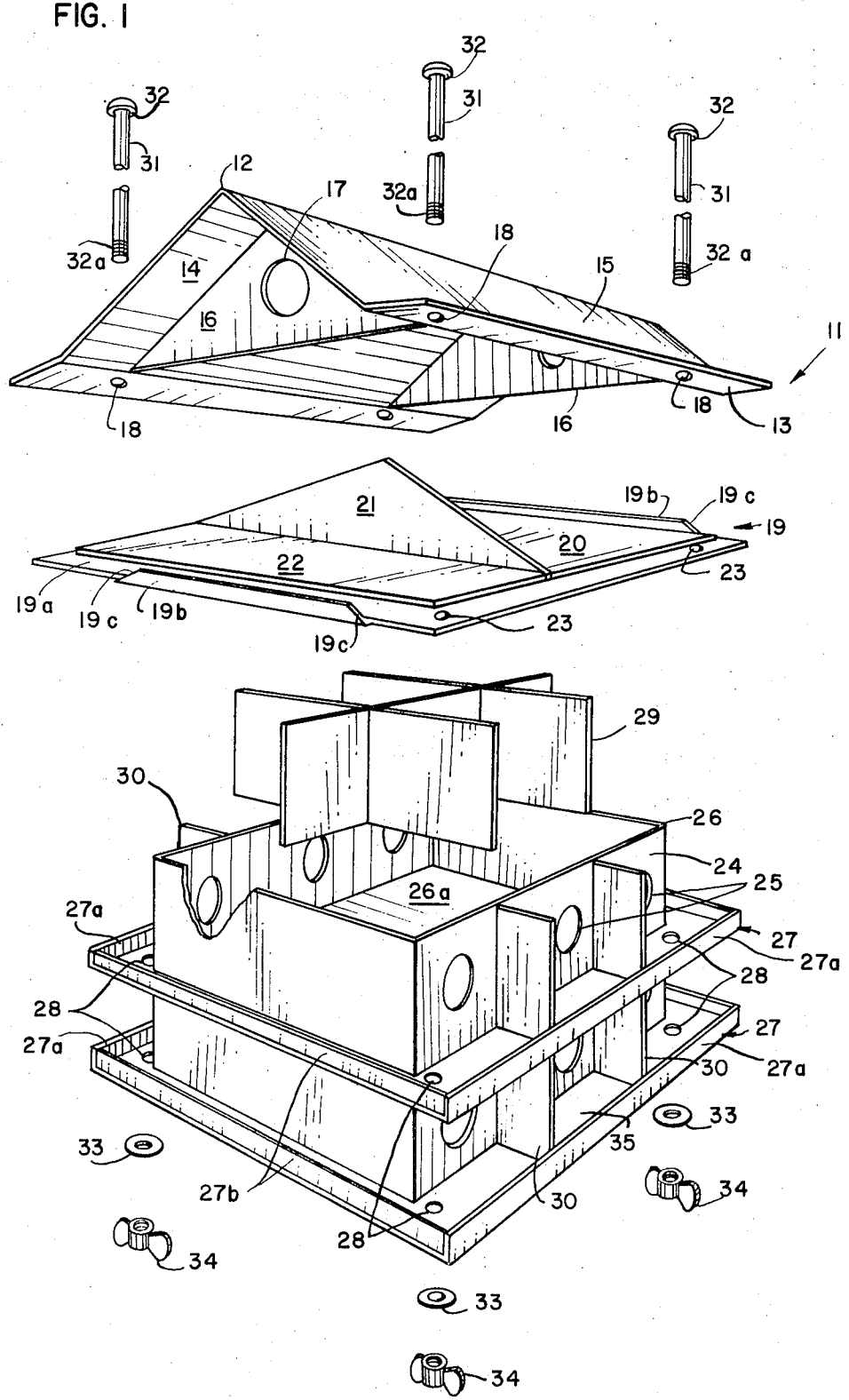

Referring now more particularly to the drawings, therein illustrated a new and improved birdhouse designated by the numeral 11. The birdhouse 11 includes a symmetrically streamlined gabled roof 15 with a rounded ridge 12 and a beveled portion 13. Said roof 15 contains four dimensionally positioned thru holes 18. Permanently affixed to said roof 15 and a distance away designated by 14 from each end is a triangular wall 16 with an entrance aperture 17. Said roof 15 rests on top of a special separation unit 19, in such a manner that the area bounded by the walls 16 fits over the edges of the raised surfaces 20 and 22 leaving uncovered areas 19a on both ends of said separation unit 19. Another triangular partition wall 21 is rigidly and permanently affixed midway beween said raised surfaces 20 and 22. It will be seen that the exposed areas of 19a serve as balcony or perch for each entrance aperture 17 on each side of the attic, said attic bounded by the roof 15 and said unit 19.

The separation unit 19 contains four circular holes 23 so positioned to be same as that for the holes 18 on roof 15. Said separation unit having raised fence edges 19b at both ends, ends of said edges being beveled at 19c to compliment gabled roof 15. Said unit 19 in turn rests on open top side 26 of a rectangular container 24. Said open top container 24 has the bottom side which serves as the floor 26a that is either permanently affixed and watertight or an integral homogeneous part of the containers 24 as in the case of a molded open top box. On two opposite sides of said container 24 are equally spaced, smooth and free of burrs, entrance aperture 25. Removably placed inside said containers 24 are permanently inter-connected vertically oriented planar smooth walls 29 that divides said container 24 into a multi-nesting-compartment, each compartment served by a corresponding entrance 25. Said walls 29 can be a one molded piece. Said container 24 is stacked in position on top of a the tier separation 27 in a manner as the width of said container 24 fits between the discontinuous partitions 30. Said partition 30 will act as individual blinds to effect individual or private balcony or perch 35 for each entrance 25. Said tier separation having raised fence edges 27a at both sides with complimentary fence piece 27b fitted and permanently affixed between ends of said raised fence edges to complete peripheral fencing of each tier separator. Said tier separation 27 contains four equally positioned thru holes 28, so positioned to be the same as that for the holes 18 on roof 15. From here on in, each additional tier will be identical as each tier comprises a container 24, partition walls 29 and a tier separation 27. The final assembly consists of positioning a bolt 31 of corresponding length thru the aligned holes 18, 23 and 28 with the flat side of the bolt head 32 restrained by the roof 15 while the threaded end 32a projects past the lat tier separation 27, washer 33 is then slipped thru the threaded end 32a followed by a wing nut. The wing nut 34 is then tightened by hand until rigidity of the stacked birdhouse components is attained.

The described arrangements offer the feature of easy cleaning. After said bolts 31 are removed, the attic and tiers are all accessible. Even selective cleaning of tiers and compartments for that matter is an easy chore as all one has to do is pull out selected tier after bolts are removed, clean said tier and compartment and slip it back after cleaning, then replace bolts and tighten wing nuts.

The most inexpensive way in the manufacture of described improved birdhouse is thru molding of each component part out of a strong and rigid all weather plastic, such as fiberglass reinforced resins. The permanent affixing of parts can easily be attained by strong general purpose and fast curing adhesives. The components likewise, can be made reasonably inexpensive thru forming of metal sheets.

What is claimed is:
1. A birdhouse comprising:
   a first and a second identical rectangular box like container, each container having opposed vertically extending front and back walls, a pair of opposed vertically extending side walls, a horizontally extending bottom wall, and an open topped chamber defined intermediate the interior surfaces of said front, side and bottom wall surfaces, and a plurality of spaced apart openings disclosed along each of the front and back wall surfaces opening into the chamber with each opening of a size to permit the ingress and egress of a bird therethrough;
   a plurality of sets of removable dividers, each set associated with one of the containers and adapted to be removably inserted into the container chamber through the open top thereof, each divider set including interconnected longitudinal and laterally projecting members for dividing the chamber of the associated container into a plurality of individual and private compartments, each compartment having associated therewith one of the openings projecting through the front and back walls of the associated container, and the dividers extending a vertical height substantially equal to the vertical height of the side and front and back wall surfaces of the associated container;
   a first and a second identical rectangularly shaped tier separation member, each separation member comprising a substantially flat base member of a width and length greater than the width and length of the bottom surface of said containers, each base member having opposed front and back edges and a pair of opposed side edges, a longitudinally extending vertically disposed fence like member extending along each of the front and back edges and projecting vertically upwardly therefrom a slight distance above the base member, a laterally extending vertically disposed fence member associated with each of the side edges of each base member and vertically extending upwardly a slight distance from the base member thereof to a height substantially equal to the height of the fence edges along the front and back edges and interconnecting the end portions of said front and back fences in a manner to define a tray like tier separation member;
   a plurality of spaced apart partitions each projecting outwardly from said front and back wall surfaces of said containers, each partition disposed intermediate adjacent openings in the container front and back wall surfaces in a manner to separate the same, each partition extending outwardly from the associated container wall surface a distance to engage the associated vertically extending fence member disposed along the front and back edges of the tier separation member when the container is placed thereon with the bottom container surface in resting engagement with the base of the associated tier separation member;
   said first container resting on said said first tier member with said second conainer resting on said second tier member, said second tier member in turn resting on the top peripheral edges of the front, back and side wall surfaces of said first container and being in spaced parallel aligned relationship to said first tier member with said first and second containers being in spaced apart parallel and aligned vertical relationship, the marginal portions of each of said tier separation members projecting beyond the exterior surfaces of the front and back wall surfaces of each container and being divided by said partitions projecting outwardly from said front and back wall surfaces and engaging said front and back fence edges to define a plurality of individual and private balconies and perches extending about the exterior of the birdhouse and associated with each of the openings in the front and back wall surfaces of each of the containers;
   a separation unit member adapted to cover the open top of said second container comprising a flat bottom surface of a width and length substantially equal to the width and length of the base member of each tier separation member, a flat top surface member juxtapositioned with the top surface of the bottom surface and of a slightly lesser width and length than the bottom surface so as to have its respective front, back and side edges spaced inwardly from the associated front, back and side edges of the bottom surface, and a triangularly shaped vertically extending member disposed laterally of the top surface member and projecting normal thereto intermediate the opposed side edges thereof;
   a gabled roof member in the form of a longitudinally extending inverted winged V-shape with the winged portions extending horizontally and adapted to rest on the portions of the bottom surface of the separation unit member adjacent the front and back edges respectively of the top surface member thereof, a pair of longitudinally spaced apart triangularly shaped cross-members disposed at opposite end portions of the roof member at positions therealong adapted to engage the respective associated side edge of the top surface member of the separation unit member when the winged portions rest on the bottom surface, each cross-member having an opening extending therethrough to permit a bird to pass freely therethrough, the triangular member on the separation unit member top surface member engaging the roof member intermediate the cross-members to divide the same into a pair of individual compartments with each compartment associated with one of the openings in the cross-members; and
   a plurality of bolt like members adapted to detachably secure the birdhouse in the assembled position with the roof member resting on the separation unit member resting on the second container resting on the second tier separation member resting on the first container resting on the first tier separation member.

2. The birdhouse as set forth in claim 1 wherein the bolt like members comprise four elongated cylindrical bolts each having an enlarged head portion and a rod like shank portion extending outwardly from the head portion and terminating in a threaded end portion, and a flat washer and threaded wing nut associated with each bolt member and adapted to threadedly engage the threaded portion of the shank to detachably retain each bolt member in position maintaining the assembled condition of the birdhouse.

3. The birdhouse as set forth in claim 2 wherein each of the winged portions of the roof member include a pair of longitudinally spaced apart openings extending vertically therethrough, the separation unit member includes along each of the front and back edges thereof a pair of longitudinally spaced apart openings extending vertically therethrough and spaced apart a distance corresponding to the spacing between said openings in the roof member, and each of said first and second tier separation members having a pair of longitudinally spaced apart openings disposed along each of the front and back edges thereof and disposed in substantial alignment with said openings in said roof member, and said bolts each associated with a set of vertically aligned openings and adapted to pass vertically therethrough to secure the components in their respective assembled positions, the head members of each bolt engaging the exterior surface of the winged portion of the roof member with the threaded end of each bolt extending through the first tier member and secured thereto by the associated washer being placed thereover and the associated wing nut being threaded thereonto.

* * * * *